May 6, 1958     E. LEVY, JR., ET AL     2,833,977
PROTECTIVE CIRCUIT FOR INVERTERS
Filed Oct. 10, 1955
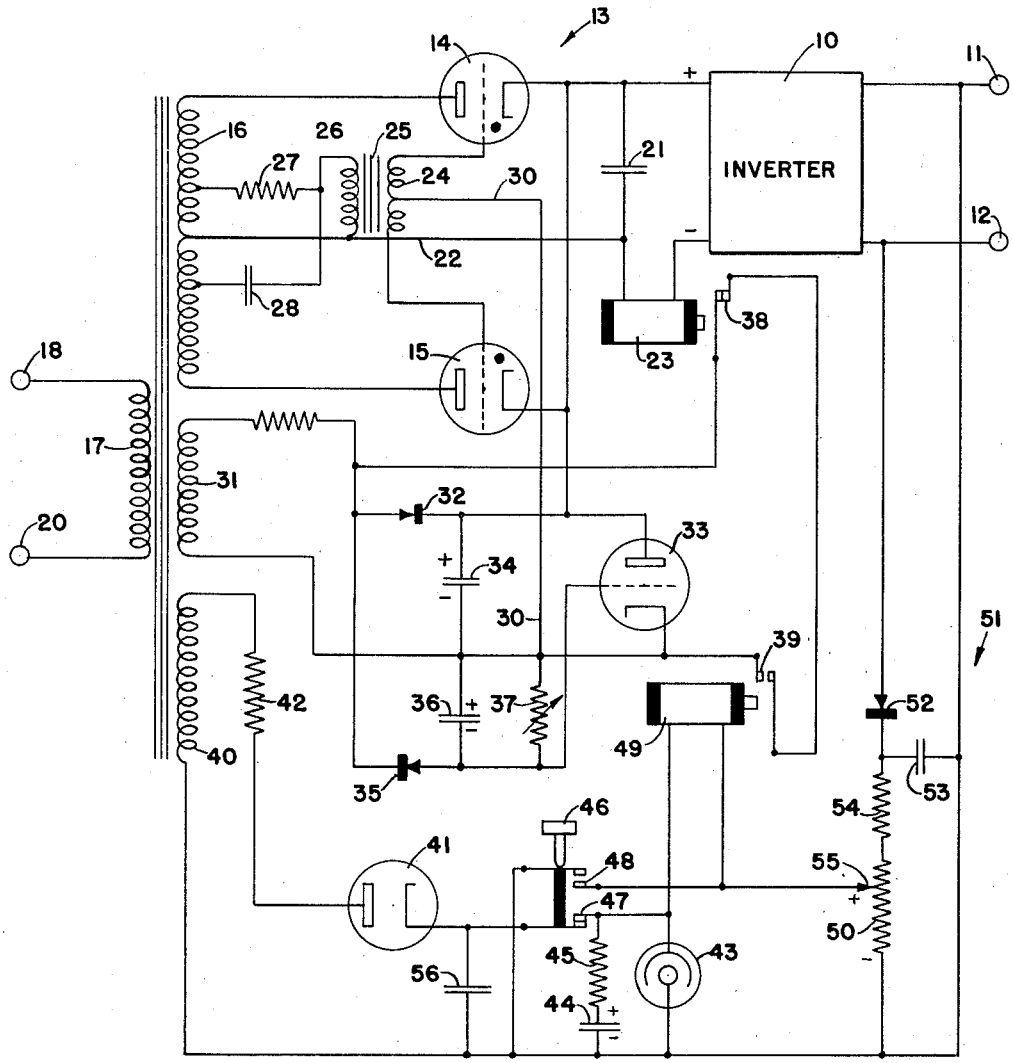
ERNEST LEVY, JR.
CHARLES MITTEL
INVENTORS
BY Ralph E. Bitner.
ATTORNEY 2,833,977
Patented May 6, 1958

2,833,977

PROTECTIVE CIRCUIT FOR INVERTERS

Ernest Levy, Jr., and Charles Mittel, Norwalk, Conn., assignors to Sorensen and Company, Stamford, Conn., a corporation of Connecticut Application October 10, 1955, Serial No. 539,412

7 Claims. (Cl. 321—2)

This invention relates to a protective circuit for use with inverters which convert direct current power into alternating current power by the use of three electrode gaseous discharge devices. It has particular reference to circuits which provide a time delay in starting, an over-voltage control, and an adjustable "clatter" circuit.

Inverters employing gaseous discharge devices do not start easily and sometimes, after having been started, one of the discharge devices may fail to fire and thereafter a continuous large direct current flows through the other discharge device and causes considerable damage to the inverter and to the output circuit.

The present invention is designed to provide a protective circuit for any of the commonly used inverter circuits and to permit easy starting at any time. In addition to the above essential characteristics, the circuit provides the following features; (a) a time delay is incorporated in the circuit so that the direct current voltage is gradually applied to the inverter when it is first turned on; (b) an over-voltage control is provided by means of a relay and a sensing circuit connected to the inverter output whereby the input power to the inverter is cut off when a predetermined excess voltage appears on the output terminals; (c) a push button control is provided for manually starting the inverter; (d) the same push button may be used to turn the inverter off; (e) a "clatter" circuit is incorporated in the circuit design which assists the inverter in resuming its normal alternating current output after one of the discharge devices has failed to fire. The time delay described in the above paragraph and the frequency of the clatter operation are both adjustable.

The invention includes a first relay connected in series with the direct current input to the inverter. This relay is operated when the current input to the inverter becomes excessive. When this relay is operated the direct current input to the inverter is cut off for a short time interval. A second relay is connected in series with a control circuit and is operated by a manual switch each time the inverter is started. When this second relay is operated it closes a circuit which controls the direct current input power applied to the inverter. The second relay may be deenergized by holding the manually operated switch in engagement for a long time interval or by a sensing circuit connected to the inverter output terminals.

One of the features of the invention includes a direct current supply circuit for the inverter which is gradually increased in voltage over a short time interval in order that the inverter may start easily. This is accomplished by gradually raising the potential of the control electrodes of a pair of grid controlled rectifiers which convert alternating current power from a supply line to direct current power for the inverter. This gradual increase in bias voltage is controlled by a three electrode discharge device whose control electrode is biased by a chargeable capacitor shunted by a variable resistor.

Another feature of the invention includes a single manually operated push button control which may be used to either start or stop the inverter. When it is desired to start the inverter the push button is depressed and immediately released. This action closes the second relay contacts by connecting a large capacitor across the relay winding. When it is desired to stop the inverter the push button is depressed for a comparatively long period of time (2 seconds or more) and the capacitor is discharged, the relay contacts are opened, and the inverter is stopped.

Another feature of the invention includes a clatter circuit which may be adjusted to increase or decrease its frequency of operation. When the inverter misfires, it draws a large direct current and opens the first relay thereby permitting two capacitors in the circuit to charge. When the relay contacts are closed the capacitors discharge in the usual manner during the starting operation. Variation of the resistance in shunt with one of these capacitors varies the clatter frequency.

One of the objects of this invention is to provide an improved protective circuit for inverters which avoids one or more of the disadvantages and limitations of prior art arrangements.

Another object of the invention is to provide a time delay for the application of the direct current power to the inverter circuit so that the inverter discharge devices receive a gradually increasing direct current voltage.

Another object of the invention is to provide an over-voltage control circuit for inverters which shuts off the direct current power when either the input or the output voltage is increased above a predetermined safe value.

Another object of the invention is to provide a manual switching means which turns the inverter on or off.

For a better understanding of the present invention, together with other and further objects thereof, reference is made to the following description taken in connection with the accompanying drawing.

The figure is a schematic diagram of connections showing an inverter circuit in block connected to output terminals and receiving its direct current power from a rectifier circuit employing two grid controlled rectifiers.

Referring now to the drawing, an inverter 10 is connected to output terminals 11 and 12 and has its input connected to a circuit which derives direct current power from a rectifier circuit 13. This rectifier circuit includes two gas-filled rectifier devices 14 and 15, each of which is controlled by a control electrode. The power for these rectifier tubes is derived from a transformer secondary 16 on a core which contains a primary winding 17 connected to input terminals 18 and 20 which are to be connected to a source of alternating current power. The secondary winding 16 has its end terminal points connected to the anodes in discharge devices 14 and 15 and its mid-point is connected to a conductor 22 which acts as the negative terminal of the rectifier circuit and is connected to the inverter 10 in series with a first relay 23. The positive terminal of the rectifier circuit is derived from both cathodes and is also connected to the inverter circuit. A capacitor 21 is connected across the rectifier output terminals in order to reduce the alternating current ripple.

In order to control the voltage supplied by the rectifier circuit the control electrodes of discharge devices 14 and 15 are connected to the terminals of a secondary winding 24 on a core 25 which also includes a primary winding 26. One side of this winding is connected to the negative conductor 22 while the other side is connected to the junction of a resistor 27 and a capacitor 28, the other ends of these components being connected to taps on the secondary winding 16. It will be obvious that the circuit which includes resistor 27 and capacitor 28 is a phase retarding network and the voltage applied to the control electrodes of tubes 14 and 15 is out of phase with the voltage applied to the anodes. By changing the phase in this manner an additional time variation is acquired when the direct current voltage is varied on the control electrodes. This method of firing gas-filled discharge devices is old in the art and has been described in prior publications. Transformer secondary 24 is tapped at its mid-point and conductor 30 is connected to a rectifier circuit which supplies the change in voltage necessary to control the output voltage of rectifier circuit 13.

Conductor 30 is connected to one terminal of a secondary winding 31 which is part of the same transformer as secondary winding 16 and primary winding 17. The other terminal of winding 31 is connected through a rectifier component 32 to the anode of a three electrode discharge device 33, the cathode of this device being connected to the other side of winding 31 and the conductor 30. A capacitor 34 is connected across the anode and cathode of tube 33 and is charged to about 300 volts by rectifier 32 when the tube 33 is in a non-conductive condition. In like manner, capacitor 36 is charged to about 300 volts by rectifier 35 and since it is connected between the cathode and the control electrode, the tube is made non-conducting. In this condition discharge devices 14 and 15 are also non-conducting since their cathodes are connected to the positive terminal of capacitor 34 and their control electrodes, by way of conductor 30, are connected to the negative terminal of this capacitor. With 300 volts negative potential (D. C.) on the control electrodes, the alternating current voltage produced by secondary winding 24 is not strong enough to fire the tubes 14 and 15. A variable resistor 37 is connected across capacitor 36 but has no appreciable effect on the circuit when tube 33 is in its non-conducting condition.

The above described capacitors 34 and 36 may be discharged by a circuit which includes relay contacts 38 and 39. When both these contacts are closed, the source of alternating current from secondary winding 31 is short-circuited and capacitor 36 first discharges through resistor 37 at a rate which is determined by the adjusted value of its resistance. As soon as the voltage across capacitor 36 is reduced below the cut-off point of tube 33, capacitor 34 is discharged through the anode-cathode circuit of the tube and negative voltage is reduced on conductor 30 to a value where the gaseous discharge devices 14 and 15 start to fire.

A third rectifier circuit is employed in connection with the output voltage sensing circuit and includes a secondary winding 40 on the same transformer which contains primary winding 17. Secondary winding 40 is connected to a diode rectifier tube 41 in series with a resistor 42 and a glow discharge voltage regulator tube 43. The voltage regulator tube 43 is connected across a circuit which includes a capacitor 44 and a resistor 45 so that capacitor 44, under normal operating conditions, is charged to the same voltage as the voltage across tube 43 which may be of the order of 150 volts. A manually operated switch button 46 is provided to open a pair of contacts 47 and close a second pair of contacts 48 when it is depressed. Contacts 47 open the circuit between one side of the voltage regulator tube and the cathode of the rectifier diode 41. Contacts 48, when closed, short-circuit a portion of a resistor 50 which is part of the sensing circuit. A relay winding 49 (having contacts 39) is connected between one side of resistor 50 and the voltage regulator tube 43.

A sensing circuit 51 is connected directly to the output terminals 11, 12, of inverter 10 and includes a rectifier component 52 and a capacitor 53 which charges up to a direct current voltage as soon as the inverter is started. Capacitor 53 is shunted by two resistors in series, 50 and 54 thereby applying a direct current voltage drop across each of these resistors. When the circuit is in operation, a contact point 55 is adjusted so that the voltage drop across winding 49 is a few volts greater than the sustaining voltage when contacts 39 are closed. For example, if the relay winding is adjusted to close contacts 39 when the voltage drop is 60 volts and to open the contacts when the voltage drop is 15 volts, then the contact point 55 is adjusted so that the drop across the relay winding is 17 or 18 volts.

The operation of this circuit is as follows: When terminals 18 and 20 are first connected to a source of alternating current power the cathode heaters are supplied with current, capacitors 34, 36, 56, and 44, are all charged to their maximum voltages, the voltage regulator tube 43 is lighted, and current flows through relay winding 49 and resistor 50 to apply about 17 volts across the winding but not to cause the contacts 39 to close. The grid controlled rectifiers do not pass current because there is a D. C. bias of minus 300 volts on their grids and the inverter receives no input and delivers no output. Contacts 38 are closed and contacts 39 are open.

Now, to start the inverter, push button 46 is depressed, contacts 48 are closed, and contacts 47 are opened. Contacts 48 short-circuit resistor 50 and capacitor 44 discharges through resistor 45 and winding 49, actuating the relay and closing contacts 39. Push button 46 must be released soon after it is depressed so that current from winding 40 and rectifier 41 may continue to send current to charge capacitor 44 and to supply current to relay winding 49 to hold contacts 39 in a closed condition. With contacts 48 open the voltage across winding 49 is about 32 volts.

When contacts 39 are closed, a short is placed across the A. C. supply and capacitor 36 discharges through resistor 37 thereby slowly raising the potential of the control electrode of triode 33. When triode 33 is made conductive, the potential of conductor 30 is raised slowly and the inverter is started. When the inverter starts, it produces alternating current at its output terminals. This is rectified and a D. C. potential is established across resistor 50 which opposes the current through relay winding 49 and the voltage across the winding is reduced to 18 volts, still enough to retain the contacts 39 in a closed condition.

The circuit is now in its normal operating condition, producing alternating current power at output terminals 11 and 12 at the inverter frequency. Now, if for any reason, an over-voltage appears at the output terminals greater than 3 volts above the rated voltage, the current through sensing circuit 51 will be increased to a value which reduces the voltage across winding 49 to a value less than 15 volts and contacts 39 will be opened, causing capacitors 34 and 36 to charge to their full value of 300 volts and the grid controlled rectifiers are biased to a condition where they will not fire and the inverter then receives no input power. After such an operation the circuit can be placed in operation only by depressing the button 46.

If the inverter misfires and one of the inverter tubes takes all the current, relay 23 is actuated, and contacts 38 are opened, breaking the short-circuit across A. C. supply 31 and permitting capacitors 34 and 36 to charge to their full value and cutting off the operation of the rectifiers as before. However, as soon as the rectifiers are cut off, or when their current supply is considerably reduced, relay 23 receives reduced current and contacts 38 are closed. The circuit is now in the same condition as it was when it was started for the first time. The bias on conductor 30 is slowly raised and the inverter is again started. If, for some reason, such as a burned out cathode heater element, one of the inverter tubes cannot be fired, the cycle of operations is repeated until a new tube is installed in place of the defective tube, or the power cut off. The above described sequence of operations is called "clattering" and is generally quite rapid, about 3 or 4 per second. The clattering rate on the present circuit may be adjusted to almost any desired value, from 10 per second to one per minute, by adjusting the value of resistance in resistor 37; the higher the resistance, the slower the clattering rate.

The following circuit constants may be used in the circuit shown in the figure and are illustrative of a specific application of the invention.

Relay 51 (actuated by 60 volts or more,
normalized by 15 volts or less), winding resistance_____ 4,000 ohms.
Resistor 50_____ 15,000 ohms.
Voltage regulator tube_____ VR-150.
Capacitor 44_____ .1 microfarad.
Output voltage_____ 125 volts.
Capacitors 34 and 36_____ .2 microfarad.

While there has been described and illustrated a specific embodiment of the invention, it will be obvious that various changes and modifications may be made in the circuit constants without departing from the field of the invention which should be limited only by the scope of the appended claims.

What is claimed is:

1. A protective circuit for inverters comprising, an inverter having a direct current input circuit and an alternating current output circuit, a direct current supply circuit which provides direct current power to said input circuit, an output relay having a winding coupled to said output circuit and having normally open contacts which are closed when the inverter is delivering a predetermined output voltage, and a voltage control circuit adapted to slowly increase the direct current potential applied to said input circuit, said control circuit including said relay contacts and a portion of said direct current supply circuit.

2. A protective circuit for inverters comprising, an inverter having a direct current input circuit and an alternating current output circuit, a direct current supply circuit connected to said input circuit which includes a gaseous discharge rectifier having a control electrode and a source of alternating current power applied to an anode in said rectifier, an output relay having a winding coupled to said output circuit and having normally open contacts which are closed when the inverter is delivering a predetermined output voltage, and a voltage control circuit which includes said control electrodes and a chargeable capacitor for slowly increasing the direct current potential applied to said input circuit, said control circuit including said relay contacts.

3. A protective circuit for inverters comprising, an inverter having a direct current input circuit and an alternating current output circuit, a direct current supply circuit connected to said input circuit which includes a source of alternating current power connected to an anode in a gaseous discharge rectifier having a control electrode adapted to control the amount of current passed by the rectifier, an output relay having a winding coupled to said ouput circuit and having normally open contacts, said relay being actuated and its contacts closed when the inverter is delivering a predetermined output voltage, a voltage supply circuit connected to said control electrode for initiating conduction through said gaseous rectifier, and a shorting circuit connected across a portion of said voltage supply circuit and containing said relay contacts for controlling the operation of the voltage supply circuit.

4. A protective circuit for inverters comprising, an inverter having a direct current input circuit and an alternating current output circuit, a direct current supply circuit connected to said input circuit which includes a source of alternating current power connected to an anode in a gaseous discharge rectifier having a control electrode adapted to control the amount of direct current power applied to the inverter, a voltage supply circuit connected to said control electrode and including a capacitor which is charged to a potential which prevents conduction through said rectifier during a starting interval, an output relay having a winding coupled to the inverter output circuit and having normally open contacts, said relay being actuated and its contacts closed when the inverter is delivering a predetermined output voltage, and a shorting circuit connected across a portion of said voltage supply and containing said relay contacts for controlling the operation of the voltage supply circuit.

5. A protective circuit for inverters in accordance with claim 4 wherein said voltage supply circuit also includes a means for discharging said capacitor and thereby permit conduction through said rectifier.

6. A protective circuit for inverters in accordance with claim 4 wherein said voltage supply circuit also includes a triode with its anode-cathode circuit connected across said capacitor for discharging said capacitor when a control electrode in the triode is controlled for conduction.

7. A protective circuit for inverters in accordance with claim 4 wherein said relay winding is also connected to a chargeable capacitor by means of a manually operated switch for actuating the relay and closing said shorting circuit.

References Cited in the file of this patent

UNITED STATES PATENTS

| 2,068,970 | Winograd | Jan. 26, 1937 |
| 2,123,859 | Winograd | July 12, 1938 |
| 2,599,228 | Brown | June 3, 1952 |